Nov. 4, 1952

T. JAMES, JR 2,616,767

BRAKE CONTROL MECHANISM

Filed Sept. 25, 1947

INVENTOR.
THOMAS JAMES JR.

BY

Carl K Hibbs

ATTORNEY

Nov. 4, 1952 — T. JAMES, JR — 2,616,767
BRAKE CONTROL MECHANISM
Filed Sept. 25, 1947 — 3 Sheets-Sheet 2

INVENTOR.
THOMAS JAMES JR.
BY
ATTORNEY

Nov. 4, 1952          T. JAMES, JR          2,616,767
BRAKE CONTROL MECHANISM
Filed Sept. 25, 1947          3 Sheets-Sheet 3
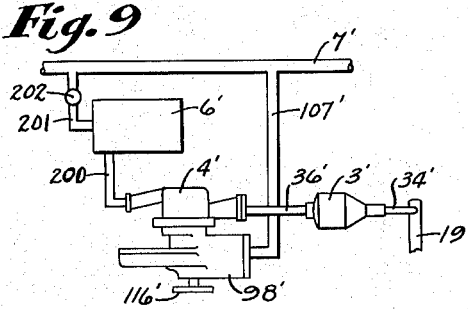
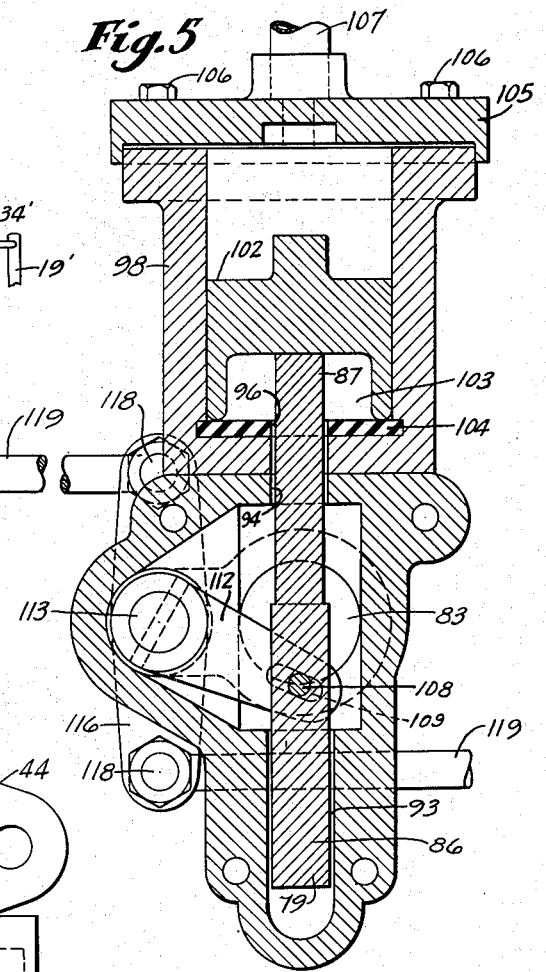
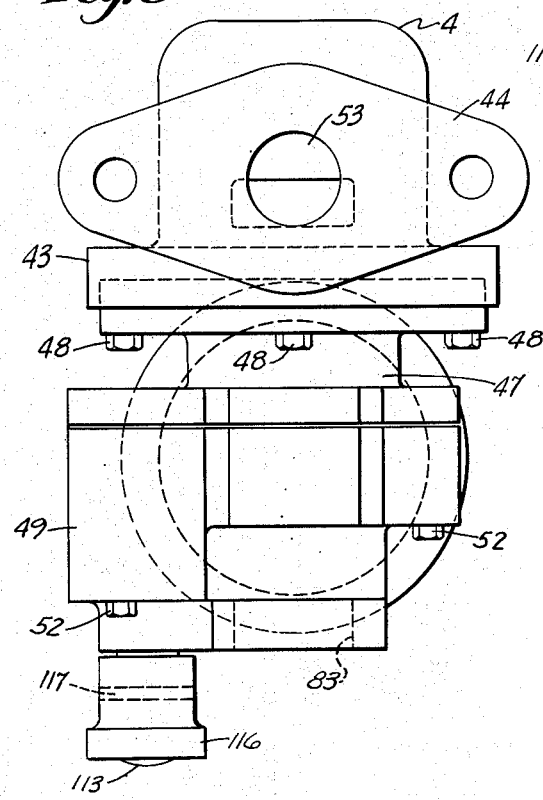
INVENTOR.
THOMAS JAMES JR.
BY
ATTORNEY Patented Nov. 4, 1952

2,616,767

UNITED STATES PATENT OFFICE 2,616,767

BRAKE CONTROL MECHANISM

Thomas James, Jr., Oaklyn, N. J.

Application September 25, 1947, Serial No. 776,020

5 Claims. (Cl. 303—68)

This invention relates to brake control mechanisms and more particularly to valve mechanisms associated therewith which enable release and application of the brakes of a car, repeatedly, after the car has been disconnected from a charged train or other main source of air supply.

In air brake systems, especially those employed on railroad cars, each car is usually provided with an auxiliary air reservoir which supplies the air pressure required to operate the associated brakes. When the cars are coupled to a charged train the auxiliary reservoirs are charged with air pressure by a main reservoir mounted on the locomotive. The air pressure in all of the auxiliary reservoirs are usually maintained at substantially the same pressure by suitable control valves. The auxiliary reservoir provided on each individual car is connected through a suitable control valve to the brake cylinder, which when charged operates to apply the brakes. In order to release the brakes the brake cylinders are connected to exhaust.

In order to release the brakes after the car has been disconnected from its main source of air supply, both the auxiliary reservoir and the brake cylinders are completely discharged. Consequently, the brakes cannot be reapplied by air pressure until the system has been recharged. Under these circumstances, until the car has again been connected to a charged train or other source of air supply, the cumbersome and unhandy hand operated mechanical brakes must be resorted to in order to either halt or prevent the movement of the car.

The present invention contemplates novel and highly useful valve means which enable the brakes to be repeatedly applied by air pressure from the auxiliary reservoir after the car has been disconnected from the main source of supply. This is accomplished by sealing the air in the auxiliary reservoir while the pressure is being relieved in the brake cylinder during brake releasing operations. Thus by conserving the air pressure in the auxiliary reservoir it may be utilized repeatedly to apply the brakes.

It is an object of the invention to provide in an air brake system a novel brake cylinder pressure release valve which will automatically "cut off" or assume a normal position after previous actuation to brake release position, when the air brake system is recharged.

A further object is to provide in a brake system of the character set forth a novel valve mechanism between the control valve and brake cylinder, which when in one position connects the brake cylinder to a source of air pressure, when in a second position connects the brake cylinder to exhaust while sealing the air supply against air flow, and when in a third position connects both the source of air supply and brake cylinder to exhaust; manual means for operating said release valve to its different positions of adjustment, and fluid pressure means for conditioning said valve for movement to said first position when the brake pipe is connected to air pressure.

In carrying out the invention in one form thereof, manually operable means are provided for repeated operation of the brake cylinder from the air supply in the reservoir for a railway car when the brake pipe is operatively disconnected from the locomotive or other source of pressure. The manually operable means includes a cam follower and a cam having a cam surface for actuating a valve from a first position for connecting the brake cylinder to said reservoir for actuating the brake to a second position for connecting the brake cylinder to exhaust to release the brake and prevent air flow from the reservoir to exhaust. Further in accordance with the invention a fluid motor means is connected to the brake pipe to actuate the cam in response to brake pipe pressure in a direction to move said cam surface away from said cam follower to permit operation of the valve from said second position to said first position by a spring or resilient means.

Other and further objects will become apparent as the description of the invention progresses.

Of the drawings:

Fig. 3 is a sectional view taken substantially along line 3—3 of Fig. 2.

Fig. 5 is a sectional view of the pressure release valve taken substantially along line 5—5 of Fig. 4.

Fig. 6 is an end view of the pressure release valve shown in Figs. 4 and 5 looking from left to right of Fig. 4.

Fig. 9 is a general assembly view, partly diagrammatic, of an air brake system of a modified construction.

Figure 1:
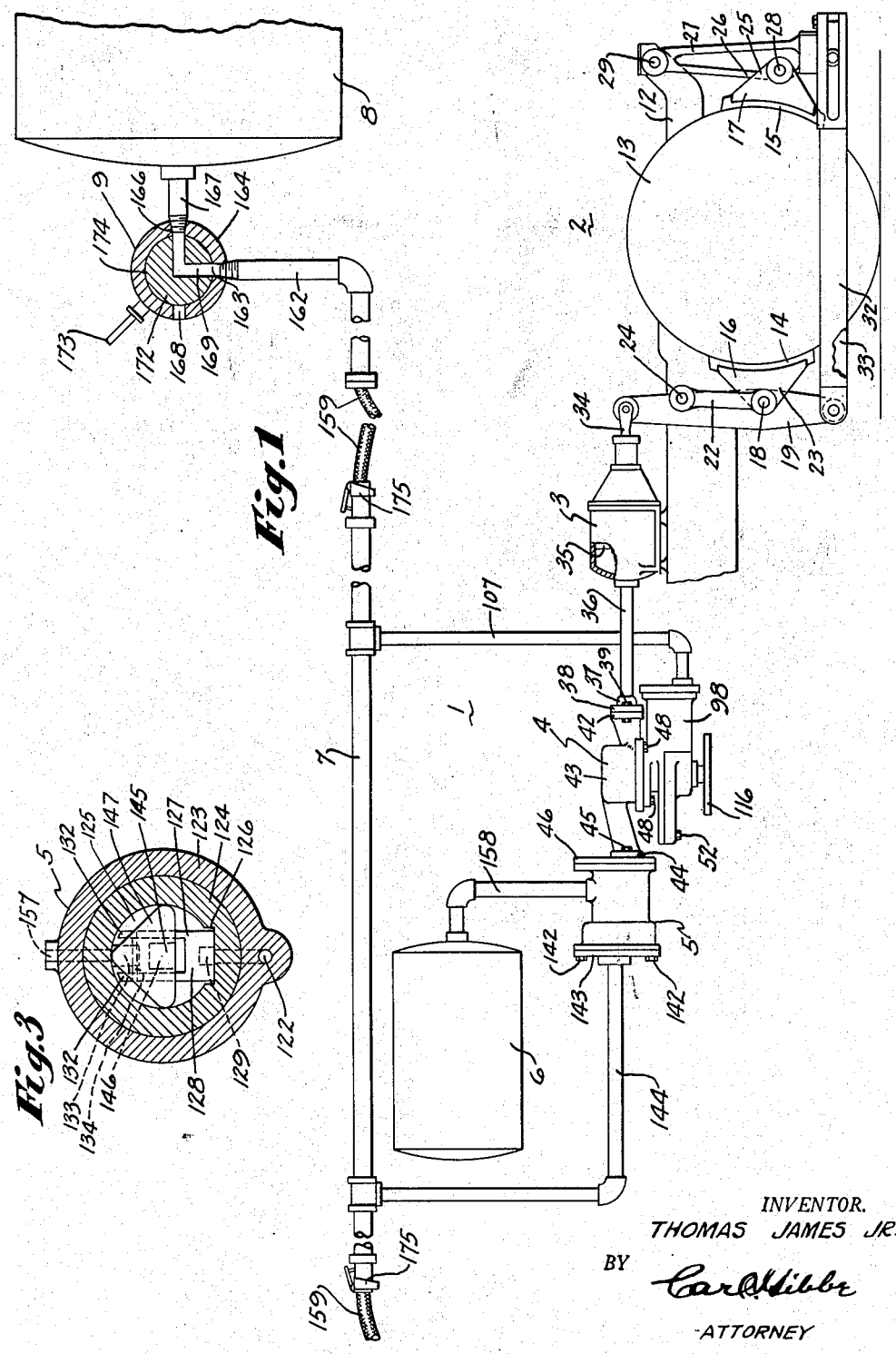
Fig. 1 is a general assembly view, diagrammatic in part and partly in section, of the complete air brake system, parts of certain of the elements thereof being shown broken away to more clearly illustrate the structure thereof.

Referring to the drawings and more particularly to Fig. 1 thereof, the numeral 1 designates the entire air brake system consisting generally of a brake mechanism 2, a brake cylinder 3, a brake pressure release valve 4, a control valve 5, an auxiliary air pressure reservoir 6, a brake pipe 7, a main source of air pressure such as a main air reservoir 8 and a valve 9 which connects and disconnects the brake pipe 7 from the main reservoir 8. All of the above referred to parts with the exception of the main reservoir 8 and the valve 9 are secured in any suitable manner to supporting structure (not shown) disposed beneath a railroad car or other structure with which the system may be associated. The main reservoir 8 and valve 9 may be mounted in any suitable manner on a locomotive, on a stationary structure adjacent a passenger or freight depot, or at any other suitable location.

The brake mechanism 2 comprises a supporting frame 12, which when the brake system is employed on railroad cars, may be the wheel truck upon which the body of the car is mounted. A wheel 13 is rotatably mounted in any suitable manner on the frame 12. Brake shoes 14 and 15 removably mounted in any suitable manner in brake heads 16 and 17, respectively, engage the periphery of wheel 13 at opposite sides thereof. Brake head 16 is supported upon a pin 18 which extends through aligned apertures provided in a substantially vertical brake operating lever 19, intermediate the ends of the latter, the lower ends of a pair of substantially vertical supporting arms 22 (only one of which is shown), and in the outer reduced portion 23 of the said brake head 16. The upper ends of arms 22 are rotatably supported on a pin 24 which in turn is secured in any suitable manner to frame 12. Lever 19 and brake shoe 14 are thus effectively supported by arms 22. Brake head 17 for brake shoe 15 is bifurcated, as shown at 25, to receive the inner extended portion 26 of a substantially vertical dead lever 27. Brake head 17 is pivotally mounted on a pin 28 which extends through aligned apertures provided in lever 27 and in the bifurcations 25 of said brake head 17. The upper end of lever 27 is pivotally supported on a pin 29 which in turn is secured to frame 12 in any suitable manner. The lower ends of levers 19 and 27 are connected by a pair of adjustable pull rods 32 and 33.

The upper end of lever 19 is pivotally connected to the outer end of the piston rod 34 of the piston 35 operating in brake cylinder 3.

From the foregoing description it is seen that upon movement of piston 35 to the right (Fig. 1) by air pressure, as will appear more fully hereinafter, brake shoes 14 and 15 are urged into contact with wheel 13. Upon movement of piston 35 to the left upon release of the pressure thereon, brake shoes 14 and 15 will be moved out of frictional contact with wheel 13.

The present invention includes the brake mechanism 2 only in the broad sense since it forms a part of the entire air brake system. Accordingly, inasmuch as the specific structure of the brake mechanism forms no part of my invention a further description thereof is unnecessary. For a full disclosure of such brake mechanisms reference may be had to my pending application Serial No. 726,284, filed February 4, 1947, for improvements in Brake Slack Adjusting Mechanisms.

The piston 35 of brake cylinder 3 is operated to the right to apply the brakes by air pressure from auxiliary reservoir 6, passing through various parts to be described and referred to generally as a conduit, during both normal and abnormal operations of the system. As shown in Fig. 1, the left hand end of brake cylinder 3 is connected by a pipe 36 to a flanged pipe coupling 37. The flange 38 of coupling 37 is secured in any suitable manner, such as by bolts 39, to a correspondingly shaped flange 42 provided at the right hand end (Figs. 1 and 4) of the upper section 43 of release valve 4. The left hand end (Fig. 4) of section 43 is also provided with a flange 44 which is secured by bolts 45 to the head plate 46 provided at the right hand end of control valve 5. Release valve 4 also comprises an intermediate section 47 secured to upper section 43 by bolts 48 and a lower section 49 which is secured by bolts 52 to the intermediate section 47. Valve 4 has been constructed in three sections for ease of manufacture, it being understood that the specific structure thereof may be varied without departing from the invention.

Upper section 43 has provided therein, an inlet passage 53 which terminates at its inner end in an enlarged substantially circular chamber 54, and an outlet passage 55 which terminates at its inner end in an enlarged valve chamber 56. A reduced circular passage 57 connects chambers 54 and 56. A valve element 58 of substantially disc-like construction is movable vertically in chamber 56 between an upper valve seat 59 provided on upper section 43 and a lower valve seat 62 provided on intermediate section 47.

Figure 7:
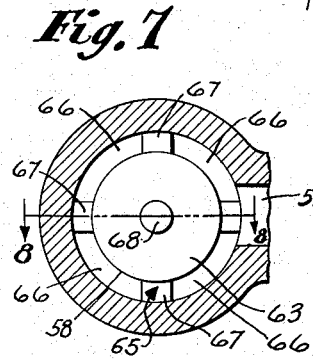
Fig. 7 is a plan view of the movable valve element of the pressure release valve together with portions of the surrounding structure shown in section.
Figure 8:
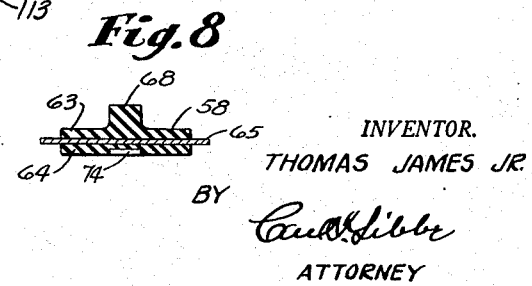
Fig. 8 is a sectional elevational view taken substantially along line 8—8 of Fig. 7.

Valve element 58 comprises upper and lower portions 63 and 64, respectively, Fig. 8, which are secured in any suitable manner to a relatively thin metallic intermediate portion 65. Upper and lower portions 63 and 64 may be constructed of any suitable flexible material such as vulcanized rubber or leather which is adapted to form an effective seal when valve element 58 is seated. Intermediate portion 65 is cut away as shown at 66 in Fig. 7 to permit air to flow past valve element 58 when the latter is unseated. The four circumferentially spaced projections 67 on intermediate portion 65 retain valve element 58 in a centered position in chamber 56 during its movement between valve seats 59 and 62. Upper portion 63 of valve element 58 has extending upwardly centrally thereof a cylindrical boss 68 which aligns with a similarly shaped boss 69 depending from the upper wall 72 of chamber 54. A resilient means, coil spring 73, surrounds bosses 68 and 69, which act as spring seats, and extends through connecting passage 57 and engages the upper portion 63 of valve element 58 and the upper wall 72 of chamber 54. Spring 73 accordingly urges valve element 58 against the lower valve seat 62. Valve element 58 will also be urged against seat 62 by air pressure when valve chamber 54 is connected to pressure.

The lower portion 64 of valve element 58 has provided centrally thereof a cylindrical recess 74 which receives the upper reduced end 75 of a cam follower 76 of the plunger type. Cam follower 76 extends through and is guided in a cylindrical opening 77 provided centrally of intermediate section 47. The lower reduced end 78 of cam follower 76 engages a reciprocatory cam member 79. A series of relatively small vertically disposed air discharge openings 82 are provided around central opening 77 which extend between and communicate with valve chamber 56 and an enlarged exhaust or discharge opening 83 which in turn extends to the lower end of the intermediate section 47. Accordingly, when valve element 58 is unseated air from the system may escape to exhaust through openings 82 and enlarged opening 83. In order to assure proper alignment of the various openings just described, intermediate section 47 is provided with a cylindrical boss 84 at the upper end thereof which seats in a correspondingly shaped recess 85 provided at the lower end of upper section 43. The parts are then secured in position by bolts 48, as previously described.

Figure 4:
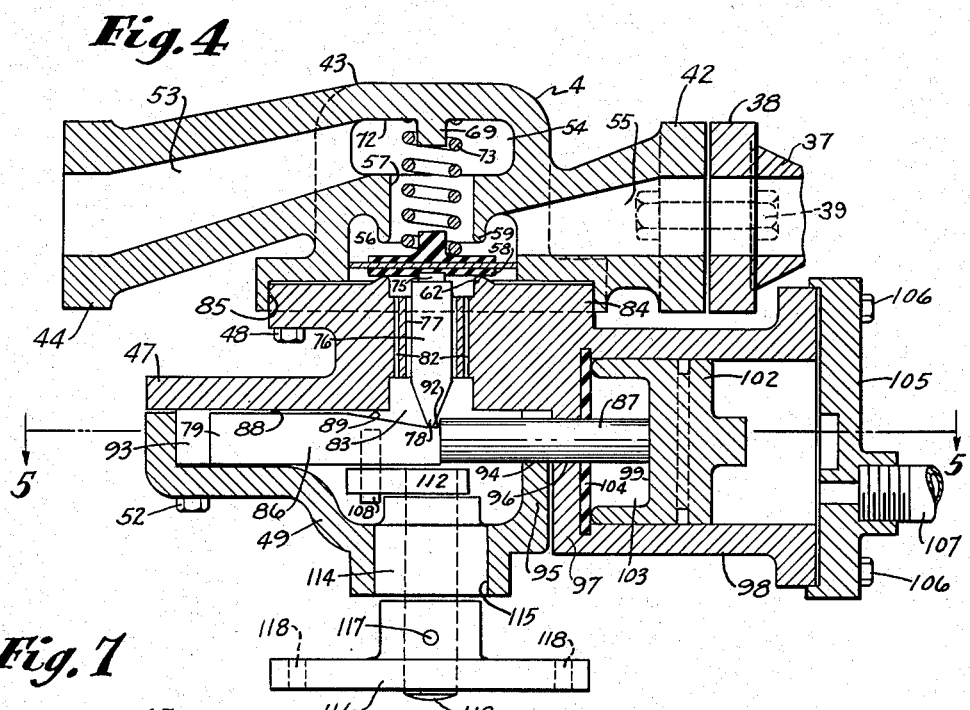
Fig. 4 is a longitudinal sectional elevational view of the pressure release valve.

Cam member 79 comprises an enlarged substantially rectangular left hand portion 86 and a slightly reduced substantially cylindrical right hand portion 87. The upper flat surface 88 of cam member 79 is cutaway intermediate the ends thereof forming an inclined cam surface 89. Cam surface 89 terminates in a substantially horizontal portion 92 at the lower end thereof which engages cam follower 76 when valve element 58 is in its lower or normal position of adjustment, as shown in Fig. 4. The upper end of cam surface 89 terminates in the upper flat surface 88 of the rectangular portion 86 of cam member 79. The two flat surfaces 88 and 92 are parallel to each other and are disposed in planes normal to the line of travel of the cam follower 76. The two flat surfaces are interconnected by the inclined surface 89 which upon movement of the cam 79 moves toward and away from the cam follower to actuate it and valve element 58 against the bias of spring 73 and to release the cam follower for actuation of the valve element 58 by the spring 73. The upper flat surface 88 functions to retain valve element 58 in its upper or brake cylinder release position of adjustment, as will appear more fully hereinafter.

The substantially rectangular end 86 of cam member 79 extends into and is guided for reciprocatory movement in a correspondingly shaped recess 93 provided in the lower section 49 of release valve 4. The substantially cylindrical end 87 of cam member 79 extends through a semicircular recess 94 provided in the end wall 95 of lower section 49 and through a circular opening 96 provided at the left hand end 97 (Fig. 4) of the fluid motor cylinder 98 integral with intermediate portion 47. Recesses 93 and 94 are open at the upper end thereof to permit assembly of the cam member 79 therein. The right hand end 87 (Fig. 4) of cam member 79 engages the left hand end 99 of a piston 102 operating in cylinder 98. The piston 102 is dished out at the left hand end thereof as shown at 103 so as to enable the cam member 79 to normally extend into cylinder 98 a substantial distance. A gasket 104 is provided at the inner end of cylinder 98 which when engaged by piston 102 forms a seal to prevent air leakage from said cylinder around the cylindrical end 87 of cam member 79.

The right hand end (Fig. 4) of cylinder 98 is closed by an end plate 105, the said end plate being secured to the cylinder in any suitable manner, such as by bolts 106. A pipe 107 connects end plate 105 to the brake pipe 7. Thus when brake pipe 7 is connected to pressure the piston 102 is operated to the inner end of cylinder 98.

As shown more particularly in Figs. 4 and 5 cam member 79 has secured to and depending therefrom a crank pin 108 which extends into the elongated slot 109 provided in the inner end of a crank arm 112. The outer end of crank arm 112 is secured in any suitable manner to the upper end of a pin 113 journalled in a bushing 114. Bushing 114 is secured in any suitable manner in the enlarged opening 115 provided at the lower end of the lower section 49 of release valve 4. A lever 116 is secured intermediate its ends to the lower end of pin 113 in any suitable manner such as by a locking pin 117. Lever 116 is provided with openings 118, 118 near the outer ends thereof for receiving operating rods 119, 119, which when the system is employed on railroad cars, extend transversely of the said cars so as to be readily accessible to a brakeman or other railroad employee. Thus to actuate valve element 58 upwardly from the position shown in Fig. 4, either of the rods 119 is urged outwardly causing operation of lever 116 and crank arm 112 in a counterclockwise direction (Fig. 5) thereby actuating cam member 79 to the right (Fig. 4). Cam surface 89 now actuates cam follower 76 and valve element 58 upwardly. Should it be desired to discharge the air from the system as for example in the event of overcharging thereof, valve element 58 is actuated substantially midway between valve seats 59 and 62. However, should it be desired to relieve the pressure in brake cylinder 3 to release the brakes and at the same time to seal the auxiliary reservoir 6 against air flow, valve element 58 is urged against valve seat 59. When cam member 79 has been moved so as to tightly urge valve element 58 against valve seat 59, the upper flat surface 88 thereof will have moved into engagement with the lower end 78 of cam follower 76. Valve element 58 consequently will be held in its uppermost position of adjustment until cam member 79 is moved in the opposite direction. In order to actuate cam member 79 to the left (Fig. 4) either of rods 119 may be moved inwardly, which causes movement of lever 116 and crank arm 112 in a clockwise direction (Fig. 5), thereby returning cam member 79 to the position shown in Figs. 4 and 5. Spring 73 now urges valve element 58 on its lower seat 62.

The parts may also be restored to normal position by piston 102. In the event that valve element 58 has been actuated to its upper position of adjustment, as previously described, and the brake pipe 7 is then connected to pressure, it is seen that piston 102 will actuate cam member 79 to the position shown in Figs. 4 and 5 and spring 73 will again actuate the said valve element 58 into engagement with lower seat 62.

It is also seen that when piston 102 is subjected to pressure by brake pipe 7, cam member 79 is held in the position shown in Figs. 4 and 5 by a pneumatic lock. Consequently cam member 79 cannot be actuated manually until the pressure in brake pipe 7 has been relieved.

Figure 2:
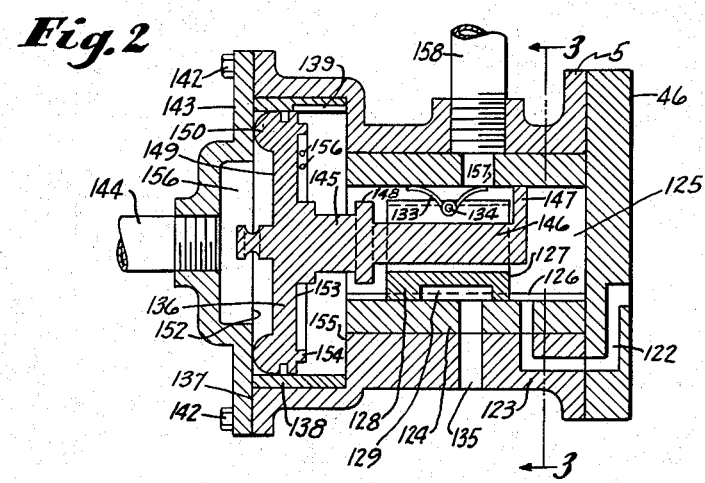
Fig. 2 is a longitudinal sectional elevational view of the control valve of the air brake system.

The flange 44 of release valve 4 is so secured to the head plate 46, Fig. 1, of control valve 5 that the inlet passage 53 thereof, Fig. 4, aligns with the outer passage 122 of said control valve. As shown more particularly in Fig. 2, outlet passage 122 is of substantially U-shaped construction and extends from head plate 46 into the outer substantially cylindrical casing portion 123 of control valve 5, thence through a cylindrical bushing 124 and into the right hand end of valve chamber 125. Bushing 124 has provided at the inner lower surface thereof a longitudinally extending guide slot 126 for a sliding valve element 127. Valve element 127 comprises a lower substantially rectangular base portion 128 having an elongated recess 129 provided in the lower surface thereof intermediate its ends, and a pair of laterally spaced, vertically extending side walls 132, 132 (Fig. 3). Side walls 132, 132 extend over the entire length of base portion 128 and the upper edges thereof are spaced slightly from the upper surface of bushing 124. A spring 133 secured to a pin 134 extending between side walls 132, 132 engages the upper inner surface of bushing 124 and resiliently retains valve element 127 in slot 126. The air pressure in valve chamber 125 also urges valve element 127 into slot 126. As shown in Figs. 2 and 3, the inner end of outlet passage 122 terminates in slot 126. A discharge passage 135 also extends downwardly from slot 126, through bushing 124 and thence through the outer casing 123 of control valve 5 to atmosphere.

When valve element 127 is in the position shown in Fig. 2, outlet passage 122 is connected to the valve chamber 125 and consequently air may flow from control valve 5 to release valve 4, and when the latter is in the position shown in Fig. 4, the said air may continue to flow to brake cylinder 3 to apply the brakes. The position of control valve 5 shown in Fig. 2 is known as the "Service" or "Emergency" position of said valve. When valve element 127 has been actuated to the right (Fig. 2) so that passages 122 and 135 are connected by recess 129, fluid from brake cylinder 3 now flows to exhaust through pipe 36, valve 4, passage 122, recess 129 and passage 135. The last mentioned position of control valve 5 is known as the "Brake Release" position thereof.

Valve member 127 is actuated to its different positions by means of a piston 136. As shown in Fig. 2 piston 136 operates in an enlarged cylinder 137 provided at the left hand end of valve casing 123. A bushing 138 having a relatively narrow slot 139 provided in the upper inner surface thereof is tightly fitted within cylinder 137 and receives piston 136. The outer or left hand flanged end (Fig. 2) of cylinder 137 has secured thereto, in any suitable manner such as by bolts 142, an end plate 143. A pipe 144 connects end plate 143 to brake pipe 7, as shown in Fig. 1.

Secured to and extending into the valve chamber 125 from piston 136 is an extended valve operating member 145. The intermediate portion 146 of member 145 in assembly, lies between the side walls 132, 132 of valve element 127 and terminates in a transversely disposed substantially triangular valve actuating element 147. A second valve operating element 148 is provided on extended member 145, which when the parts are in the position shown in Fig. 2, is spaced slightly from the inner or left hand end of valve element 127. When in the position shown in Fig. 2, valve element 127 has been actuated to the left by element 147, the latter still being in engagement therewith. As shown in Figs. 2 and 3, intermediate portion 146 is spaced slightly from the side walls 132, 132 and from the upper side of the base portion 128 of valve element 127, while operating elements 147 and 148 extend beyond and lie exteriorly of the end extremities of said valve element. Accordingly, piston 136 and member 145 will move relative to valve element 127 a predetermined distance until either element 127 or element 148 engages said valve element, when both will then move in unison during the remainder of the travel of said piston. As shown in Figs. 2 and 3, air in valve chamber 125 is free to flow around member 145 and the valve operating elements 147 and 148 thereof.

Piston 136 has provided around the outer extremity of the left hand face 149 thereof an annular, semicircular flange 150 which, when the parts are in the position shown in Fig. 2, engages the inner face 152 of end plate 143 forming a seal therebetween and preventing air from auxiliary reservoir 6 from escaping to brake pipe 7. The other side 153 of piston 136 also has provided thereon an annular flange 154 which, when the said piston has been fully actuated to the right (Fig. 2) engages the right hand end wall 155 of cylinder 137, thereby preventing air in brake pipe 7 from entering valve chamber 125 around the said piston 136. When piston 136 has been moved to the right (Fig. 2) as just described the left hand end of slot 139 will extend slightly to the left of said piston, thereby establishing communication with the left hand end 156 of cylinder 137 and permitting air from brake pipe 7 to flow into slot 139 and thence into the annular chamber defined by the periphery of flange 154, bushing 138, the right side 153 of piston 136 and the wall 155 of cylinder 137. In order to permit a small quantity of air from brake pipe 7 to enter valve chamber 125 to recharge auxiliary reservoir 6, flange 154 has provided therein one or more small openings 156. Thus when piston 136 has moved to the right, valve element 127 will also have been moved to the right by element 148 causing the said valve element to connect passages 122 and 135. Air from valve chamber 125 therefore cannot escape through either of passages 122 or 135. Accordingly air under pressure from brake pipe 7 will now flow into slot 139 in bushing 138, thence into the annular chamber between flange 154 and bushing 138, thence through openings 156, thence around member 145 and into valve chamber 125, from which it flows to auxiliary reservoir 6 through a passage 157 provided in the upper end of bushing 124 and casing 123 and a pipe 158 which connects control valve 5 to the said reservoir.

As shown in Fig. 1 brake pipe 7 is connected by a flexible pipe connection 159 to a branch pipe 162 which in turn is connected to the outlet port 163 provided in the casing 164 of valve 9. The inlet port 166 in valve casing 164 is connected by a pipe 167 to the main reservoir 8. Valve casing 164 has also provided therein an exhaust port 168. The ports 163, 166 and 168 are spaced ninety degrees apart and certain pairs of said ports are adapted to register with an L-shaped passage 169 provided in the rotary valve element 172 of valve 9. A handle 173 is secured to valve element 172 in any suitable manner for actuating the latter to its different positions of adjustment. When valve 9 is in the position shown in Fig. 1, air pressure from main reservoir 8 flows into brake pipe 7 to charge the latter. Upon movement of valve element 172 a distance of ninety degrees in a clockwise direction, L-shaped passage 169 in valve element 172 registers with outlet port 163 and exhaust port 168 thereby connecting brake pipe 7 to exhaust. When in the last mentioned position of adjustment the solid portion 174 of valve element 172 closes inlet port 166 thereby preventing the escape of air from main reservoir 8.

In air brake systems for railroad cars, a brake pipe 7 extends over the length of each car and has a flexible pipe connection 159 provided at each end thereof. The flexible pipe connections 159 enable the brake pipes of all the cars of a train to be connected. The valve 9, as previously described, is mounted on the locomotive and when in the position shown in Fig. 1 operates to charge the entire system. A valve 175 is provided adjacent each flexible pipe connection to prevent the escape of air from the system when the cars of a train are being interconnected. The valves 175 also prevent the escape of air from the system while the cars are being uncoupled from the train.

From the foregoing description the operations of my improved air brake system is thought to be apparent. However, in order to correlate the various elements thereof a brief description of the operation of the system as a whole will now be given.

During normal operations of the system, that is, when one or more railroad cars, for example, are connected to a locomotive, the valve 175 disposed at the outer end of the end car is closed to prevent the escape of air from the system, all of the other valves 175 being open. Now to release the brakes, valve 9 is moved to the position shown in Fig. 1 causing air pressure from main reservoir 8 to charge the brake pipe 7. Air pressure from brake pipe 7 now enters the left hand end (Fig. 2) of cylinder 137 of control valve 5, causing the piston 136 to move to the right, and consequently causing valve operating element 148 on member 145 to also actuate valve element 127 to the right. The recess 129 at the lower end of valve element 127 now connects outlet passage 122 of control valve 5 with the discharge passage 135 thereof, thereby connecting brake cylinder 3 to exhaust through pipe 36, passages 55, 57 and 53 of release valve 4 and the said passages 122 and 135 of control valve 5. Air pressure from brake pipe 7 also enters the right hand end (Figs. 1 and 4) of release valve 4 thereby actuating piston 102 and cam member 79 to the position shown in Fig. 4, allowing spring 73 to urge valve element 58 on its lower seat 62. Thus, in the event that any of the valve elements 58 had been previously moved into engagement with its upper seat 59, upon charging brake pipe 7 as just described, such valve elements will immediately move to their normal position, as shown in Fig. 4. Consequently air may now flow in either direction through passages 53, 57 and 55 of release valve 4 during operations of the brake mechanism.

When valve element 127 of control valve 5 has been moved to the right, as previously described, air from valve chamber 125 cannot escape through passages 122 or 135. However, since chamber 125 is directly connected to auxiliary reservoir 6 by means of passage 157 and pipe 158 air is free to flow therebetween. Accordingly, auxiliary reservoir 6 may now be charged by air pressure from brake pipe 7, the air from the latter flowing into chamber 156 of cylinder 137, thence into slot 139, thence into the annular chamber defined by flange 154, bushing 138, piston 136 and end wall 155 of said cylinder 137, thence through openings 156 in flange 154 and into valve chamber 125 around extended portion 145 of piston 136, and thence into auxiliary reservoir 6 through passage 157 and pipe 158.

Now in order to apply the brakes, valve element 172 of valve 9 is rotated ninety degrees in a clockwise direction, causing passage 169 thereof to register with outlet port 163 and exhaust port 168, thereby connecting brake pipe 7 to exhaust and at the same time sealing inlet port 166 against air flow. Inasmuch as brake pipe 7 is now connected to exhaust the pressure at the left side of the piston 136 of control valve 5 is immediately reduced. The pressure at the right side (Fig. 2) of piston 136 supplied by auxiliary reservoir 6 now moves said piston to the left. After movement of piston 136 a predetermined distance to the left (Fig. 2) valve operating element 147 engages valve element 127 and moves the latter to the position shown in Fig. 2, thereby uncovering passage 122. Air pressure from auxiliary reservoir 6 now flows through outlet passage 122, of valve 5, passages 53, 57 and 55 of valve 4, pipe 36 and into brake cylinder 3 causing the piston 35 operating therein to apply the brakes. The brakes now remain applied until brake pipe 7 is again charged as previously described.

The brakes are thus applied and released while the cars are connected to a charged train. This operation may be considered as the normal operation of the air brake system.

In order to relieve the pressure in the auxiliary reservoir 6 and brake cylinder 3 in the event of overcharging thereof by brake pipe 7, the said brake pipe is first connected to exhaust by operation of valve 9, as previously described. Valve element 58 of release valve 4 is then moved upwardly between valve seats 59 and 62 by manipulating rods 119 to permit air from reservoir 6 and brake cylinder 3 to escape to exhaust through passages 82 and 83 until the desired pressure is attained. The pressure in the system may also be fully discharged in this manner if it is so desired.

Supposing now that a car is uncoupled from the train, valves 175 are first opened to connect brake pipe 7 to exhaust. Piston 136 will now be moved to the left (Fig. 2) by air pressure from auxiliary reservoir 6 causing valve element 127 to assume the position shown in Fig. 2. The piston 35 of brake cylinder 3 will now be operated by air pressure from auxiliary reservoir 6 to apply the brakes. Should it now be desired to move the car it obviously is first necessary to release the brakes. Accordingly one of the rods 119 is moved outwardly. This movement of rod 119 actuates lever 116 and crank arm 112 in a counterclockwise direction (Fig. 5) and shifts cam member 79 to the right (Fig. 4). Valve element 58 is now urged upwardly against valve seat 59 by cam 89 and cam follower 76 thereby cutting off further air flow from reservoir 6. When in fully operated position the lower end of cam follower 76 will rest upon the flat surface 88 at the top of cam member 79 thereby effectively holding valve element 58 in its uppermost position of adjustment. Air from brake cylinder 3 now discharges to exhaust through pipe 36, passage 55, valve chamber 56, openings 66, openings 82 and exhaust opening 83, thereby releasing the brakes and permitting the car to be moved.

Should it be desired to again apply the brakes, one of rods 119 is moved inwardly thereby causing movement of lever 116 and crank arm 112 in a clockwise direction (Fig. 5) and shifting of cam member 79 to the left (Fig. 4) to the position shown in Figs. 4 and 5. The lower flat surface 92 of cam member 79 now registers with cam follower 76 whereupon spring 73 urges valve element 58 upon its lower seat 62. The exhaust passages 82 and 83 are now cut off and air from reservoir 6 again flows to brake cylinder 3 causing the piston 35 operating therein to again apply the brakes.

By sealing the reservoir 6 against air flow during the brake releasing operations the fluid pressure therein is effectively conserved. The brakes, therefore, may be applied and released without necessitating recharging of the brake pipe.

When the car is again connected to a charged train piston 102 operates to restore cam member 79 to the normal position shown in Fig. 4 whereupon spring 73 operates to also restore valve element 58 to its normal position on valve seat 62. The device, therefore, is automatically conditioned for normal operation, of the system, as previously described.

Fig. 9 illustrates a modified construction wherein the control valve 5 is eliminated from the system. The system shown in Fig. 9 also comprises a brake cylinder 3' whose piston rod 34' is connected to a brake lever 19'. Brake cylinder 3' is connected to the outlet end of a release valve 4' by a pipe 36', the inlet end thereof being directly connected to an auxiliary air pressure reservoir 6' by a pipe 200. Auxiliary reservoir 6' is connected to a brake pipe 7' by a branch pipe 201 having a check valve 202 provided therein to prevent a reverse flow from said reservoir to said brake pipe when the latter is connected to exhaust. A branch pipe 107' also connects the cylinder 93' of valve 4' to brake pipe 7'. A lever 116' operates a cam element (not shown) similar to the cam element 79 shown in Fig. 4 to effect application and release of the brakes, as previously described. The auxiliary reservoir is charged directly by the air pressure in brake pipe 7' the check valve 202 operating as previously described to prevent a reverse flow of air when the pressure in said brake pipe is relieved.

From the foregoing description it is seen that novel and highly improved air brake systems have been provided. By utilizing the improved brake cylinder release valve in an air brake system the air pressure in the auxiliary reservoir is conserved. Consequently the brakes may be applied repeatedly without recharging the brake pipe. When the car has been connected to a charged train the brake release valve is automatically restored to normal position so as not to interfere in any way with the normal operation of the air brake system.

While the air brake systems shown herein, have been described in association with railroad cars, it is apparent that they are equally adapted for other uses as well. It is also apparent that gases other than air may be used as the operating medium as well as liquids such as water or oil, without departing from the invention. The specific devices herein described may also be modified to satisfy the specific requirements of the apparatus with which they may be associated without departing from the invention.

Accordingly, while the embodiments herein shown and described are admirably adapted to fulfill the objects primarily stated, it is to be understood that it is not intended to limit the invention thereto since it may be embodied in other forms, all coming within the scope of the claims which follow.

What is claimed is:

1. In a railway air-brake system including a brake, a brake cylinder for actuating said brake, and a brake pipe adapted for connection to and disconnection from a locomotive or other source of air pressure, the combination of means for actuating said brake comprising a conduit connected to said brake cylinder, an air-pressure reservoir, means including a valve movable to different positions interposed in said conduit between said reservoir and said brake cylinder, said valve when in a first position connecting said brake cylinder to said reservoir for actuating said brake, said valve when in a second position connecting said brake cylinder to exhaust to release the brake and preventing air flow from said reservoir thereby conserving the air pressure in said reservoir, manually operable means for repeated operation of said brake cylinder from the air supply in said reservoir when said brake pipe is operatively disconnected from the locomotive or other source of pressure, said operating means including a cam follower and a cam having a cam surface for actuating said valve from said first position to said second position, resilient means for actuating said valve from said second position to said first position upon movement of said cam surface away from said cam follower, and fluid-motor means connected to said brake pipe for actuating said cam to move its surface away from said cam follower for operation of said valve by said resilient means to said first position.

2. In a railway brake system including a brake, a brake cylinder for actuating said brake, and a brake pipe for connection to and disconnection from a locomotive or other source of air, the combination of means for actuating said brake comprising a conduit connected to said brake cylinder, an air pressure reservoir, valve means interposed in said conduit between said reservoir and said cylinder and having an element movable to different positions with respect to a pair of valve seats, said valve element when in a first position against a first one of said seats connecting said brake cylinder to said reservoir for actuating said brake, said valve element when in a second position against the second one of said seats connecting said brake cylinder to exhaust to release the brake while preventing air flow from said reservoir, thereby conserving air in said reservoir, manually operable means for repeated operation of said brake cylinder from the air supply in said reservoir when said brake pipe is disconnected from the locomotive or other source of pressure, said manual means including a cam follower and a cam movable between a first position and a second position and having an inclined surface interconnecting two parallel surfaces disposed in planes normal to the line of movement of said cam follower for actuating said valve element from said first position to said second position, resilient means for biasing and actuating said valve element from said second position to said first position after movement of said inclined surface away from said cam follower, said follower in said two positions of said cam respectively bearing upon said parallel surfaces, and fluid-motor means connected to said brake pipe for actuating said cam in response to brake pipe pressure in a direction to move said cam surface away from said cam follower for operation of said valve element to said first position by said resilient means.

3. In a railway air-brake system including a brake, a brake cylinder for actuating said brake and a brake pipe adapted for connection to and disconnection from a locomotive or other source of air pressure, the combination of means for actuating said brake in the absence of brake-pipe pressure, comprising a conduit connected to said brake cylinder, an air-pressure reservoir connected to said conduit, valve means including a valve element movable to different positions interposed in said conduit between said reservoir and said brake cylinder, said valve element when in a first position connecting said brake cylinder to said reservoir for actuating said brake, said valve element when in a second position connecting said brake cylinder to exhaust to release the brake and preventing air flow from said reservoir thereby conserving the air pressure in said reservoir, operating means for repeated manual operation of said valve element when said brake pipe is operatively disconnected from the locomotive or other source of pressure for repeated operation of said brake cylinder from the air supply in said reservoir, said operating means including a cam follower and a cam having a surface for actuating said valve element from said first position to said second position, resilient means for actuating said valve element from said second position to said first position upon movement of said cam surface away from said cam follower, and fluid-motor means connected to said brake pipe for actuating said cam to move its surface away from said follower for operation of said valve element by said resilient means to said first position and for exerting a force upon said cam to hold it in its said last-mentioned position.

4. In a railway air-brake system including a brake, a brake cylinder for actuating said brake and a brake pipe adapted for connection to and disconnection from a locomotive or other source of air pressure, the combination of means for actuating said brake in the absence of brake-pipe pressure comprising a conduit connected to said cylinder, an air-pressure reservoir connected to said conduit, valve means interposed in said conduit between said reservoir and said cylinder and having an element movable to different positions with respect to a pair of valve seats, said valve element when in a first position against a first one of said seats connecting said brake cylinder to said reservoir for actuating said brake, said valve element when in a second position against the second one of said seats connecting said brake cylinder to exhaust to release the brake and preventing air flow from said reservoir, thereby conserving the air pressure in said reservoir, operating means for repeated manual operation of said valve element when said brake pipe is disconnected from the locomotive or other source of pressure for repeated operation of said brake cylinder from the air supply in said reservoir, said operating means including a cam follower and a cam movable from a first position to a second position and having a surface for actuating said valve element from said first position to said second position, resilient means for biasing and actuating said valve element from said second position to said first position after movement of said cam surface away from said follower, and fluid-motor means connected to said brake pipe and operable upon return of pressure to said brake pipe for actuating said cam in a direction to move said cam surface away from said cam follower for operation of said follower and of said valve element to said first position by said resilient means and for exerting a force upon said cam to hold it in its said first position.

5. In a railway air-brake system including a brake, a brake cylinder for actuating said brake and a brake pipe adapted for connection to and disconnection from a locomotive or other source of air pressure, the combination of means for actuating said brake in the absence of brake-pipe pressure comprising a conduit connected to said cylinder, an air-pressure reservoir connected to said conduit, valve means interposed in said conduit between said reservoir and said cylinder and having an element movable to different positions with respect to a pair of valve seats, said valve element when in a first position against a first one of said seats connecting said brake cylinder to said reservoir for actuating said brake, said valve element when in a second position against the second one of said seats connecting said brake cylinder to exhaust to release the brake and preventing air flow from said reservoir, thereby conserving the air pressure in said reservoir, operating means for repeated manual operation of said valve element when said brake pipe is disconnected from the locomotive or other source of pressure for repeated operation of said brake cylinder from the air supply in said reservoir, said operating means including a cam follower and an elongated cam movable from a first position to a second position and having an inclined surface movable beneath and against said follower for actuating said valve element from said first position to said second position, said inclined surface joining a flat surface of said cam against which said follower rests when said element is moved to said second position, resilient means for biasing and actuating said valve element from said second position to said first position after movement of said cam surface away from said follower, and fluid-motor means connected to said brake pipe having a member movable into driving relationship with said cam and operable upon return of pressure to said brake pipe for actuating said cam in a direction to move said inclined cam surface in a direction for movement of said cam follower and of said valve element to said first position by said resilient means, said fluid-motor means exerting a force upon said cam to hold it in its said first position as long as said brake-pipe pressure persists.

THOMAS JAMES, Jr.

REFERENCES CITED

The following references are of record in the file of this patent:

UNITED STATES PATENTS

| Number | Name | Date |
| --- | --- | --- |
| 1,464,640 | Breck et al. | Aug. 14, 1923 |
| 2,287,775 | Baker et al. | June 30, 1942 |
| 2,350,242 | McAlpine | May 30, 1944 |
| 2,388,538 | Hamrick | Nov. 6, 1945 |
| 2,392,185 | Pickert | Jan. 1, 1946 |